Figure 1:
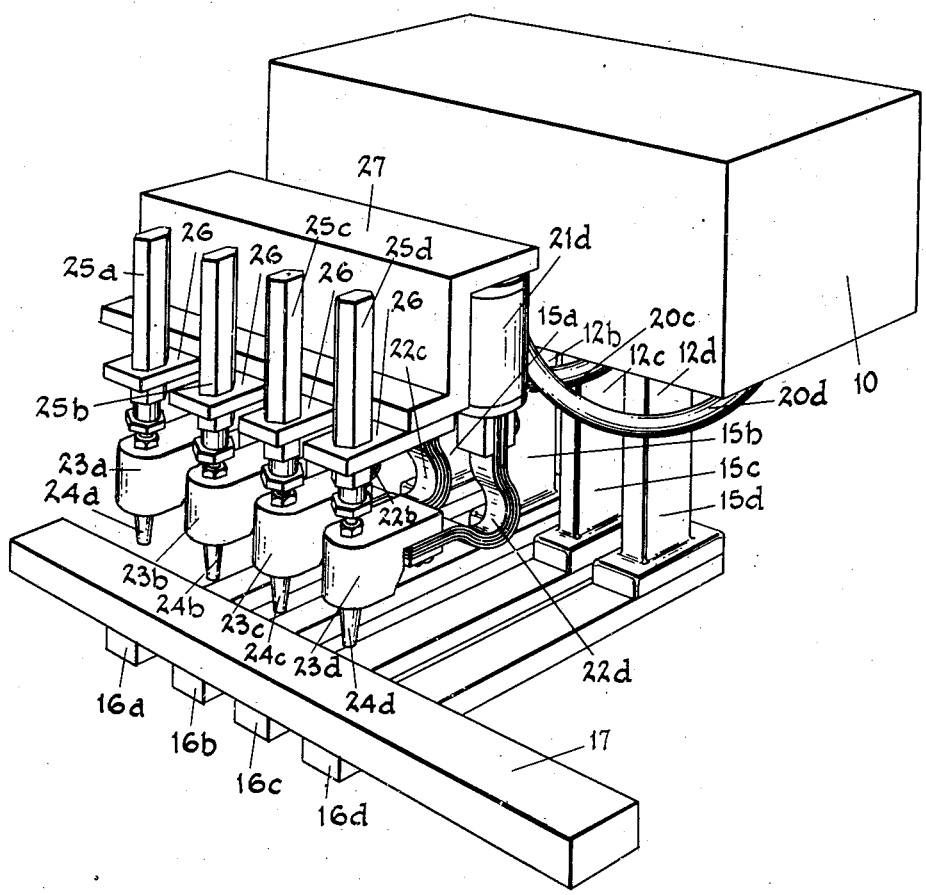

June 8, 1948. W. H. MARTIN 2,443,077
WELDING MACHINE
Filed June 14, 1946 3 Sheets-Sheet 1

INVENTOR.
William H. Martin
BY

June 8, 1948. W. H. MARTIN 2,443,077
WELDING MACHINE

Filed June 14, 1946 3 Sheets-Sheet 2

INVENTOR.
William H. Martin
BY
[signature]

June 8, 1948.　　　W. H. MARTIN　　　2,443,077
WELDING MACHINE

Filed June 14, 1946　　　　　　　　　　　3 Sheets-Sheet 3

INVENTOR.
William H. Martin
BY
Thurman Champion

Patented June 8, 1948

2,443,077

UNITED STATES PATENT OFFICE 2,443,077

WELDING MACHINE

William H. Martin, Detroit, Mich., assignor to Martin Electric Company, Detroit, Mich., a corporation of Michigan Application June 14, 1946, Serial No. 676,649

4 Claims. (Cl. 219—4)

The invention relates to a welding machine by which a plurality of spot welds is effected simultaneously in a single operation of the machine. Particularly, the invention relates to a welding machine so constructed as to enable the production of a plurality of spot welds in closely positioned relation to each other over an extended line of jointure of the work.

Heretofore it has been the practice, as illustrated in United States Letters Patent No. 2,242,867, for a Welding machine, issued to me on May 20, 1941, to provide a welding machine having a plurality of contiguously located transformers having welding electrodes connected to the terminal bars thereof and arranged in closely disposed relation and in sets, one set being above and the other below the work, the transformers producing potential in certain electrodes of each set opposite to that of their neighboring electrodes of the set and that of the coacting electrodes of the other set on the opposite side of the work. This arrangement reduced undesired current reaction in the work and enabled the production of a more or less improved and uniform current flow between the electrodes resulting in uniform welding at the point of electrode contact with the work, excepting at the outer electrodes of each set and provided the transformer were selected to produce a potential according to its relative position in the bank of transformers, whether outer or innermost in the contiguously arranged plurality. Other compensating or controlling arrangements have been proposed to cope with the problem of balanced potential between all the electrodes, all of which require special fabrication and materially increased cost.

My invention has for its object to provide a welding machine which by its construction partakes of all the advantages residing in the prior art machines and in addition dispenses and eliminates the need for the use of specially selected transformers capable of producing different potentials. As a consequence of my invention a builder of the welding machine of my invention may utilize standardized transformers and mount them in the bank without regard to the inner and outer position or the rated capability thereof to produce potentials of certain values. Such advantage materially reduces costs of the component elements of the welding machine, eliminates special storage and stocking problems and enables the use of less experienced and responsible labor in fabrication.

Further, my invention, aside from reducing costs in the manner mentioned, provides a welding machine which produces precisely the same current flow by precisely the same potential to produce uniform welds through the entire line of multiple welds.

My invention has for a particular object to provide a welding machine for producing simultaneous and a multiple of spot welds having a transformer with a single master primary and a multiple of secondaries; the terminals of each secondary being connected in individual circuit either with a single welding electrode of the desired plurality of electrodes mounted on the machine and with a work supporting bus or with alternately disposed electrodes. The provision of the single primary enables considerable saving in space and allows for further compaction of the transformers in the space adjacent the work. This arrangement also enables the disposition of the secondaries in close proximity to their connected electrodes with resultant foreshortening of the electrical leads between the electrode and secondary terminals and reduction in current losses occurring in transmission through the leads.

Further, each circuit through each electrode is individualized so that the potential loss, by reason of inductive reactance, is reduced and at the same time current flow is maintained uniform through all electrodes wherever, with reference to the work or other electrodes, they may be positioned.

The invention consists in other features and advantages which will appear from the following description and upon examination of the drawings. Structures containing the invention may partake of different forms and still embody the invention. To illustrate a practical application of the invention, I have selected a welding machine as an example of the various structures and details thereof that contain the invention and shall describe the selected structure hereinafter, it being understood that variations may be made without departing from the spirit of the invention. The particular structure selected is shown in the accompanying drawings and described hereinafter.

Figure 2:
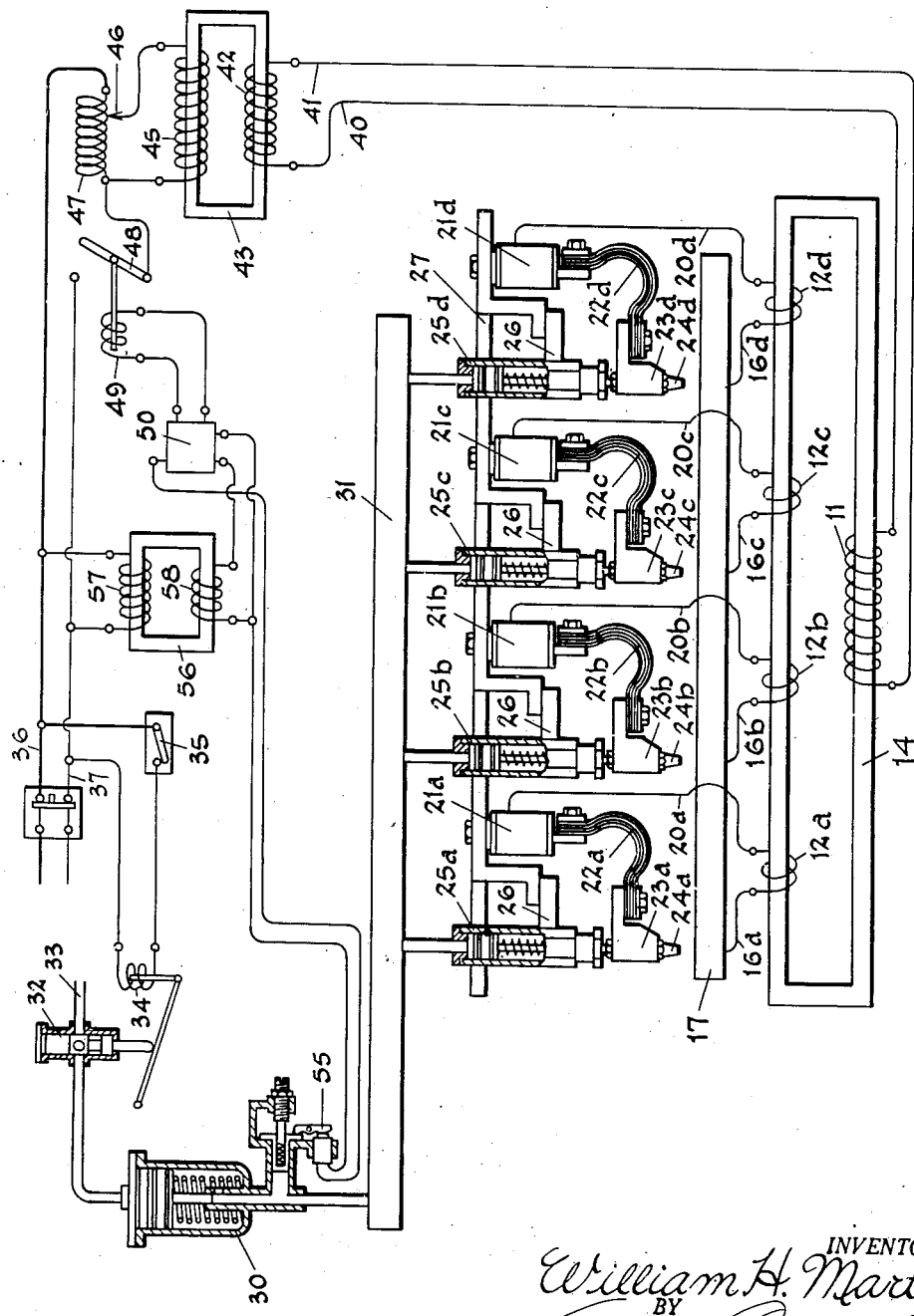
Figure 3:
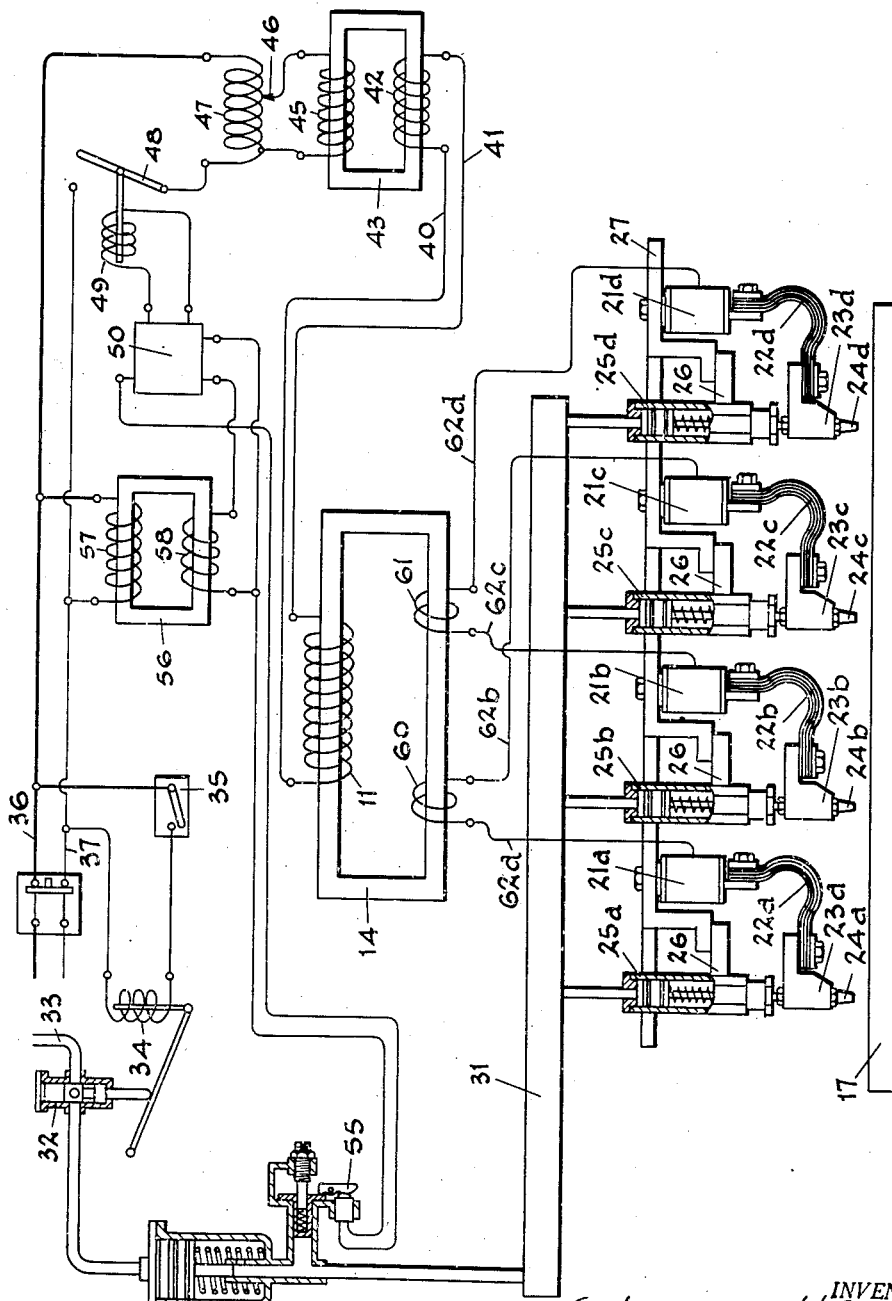

Fig. 1 is a perspective view of a part of the welding machine wherein the terminal bars, welder electrodes and work supporting bus are disclosed. Fig. 2 is a diagrammatic illustration showing the electric connections in the preferred direct weld arrangement of the machine parts shown in Fig. 1. Fig. 3 is a diagrammatic illustration showing the electric connections in a modified series weld arrangement to which the machine shown in Fig. 1 is readily adaptable.

The parts shown in Fig. 1 may be mounted in a machine frame of any desired form in accordance with the work and its contour. The machine is provided with a multiple secondary transformer 10 and having a single primary winding 11 and a multiple of secondary windings 12a, 12b, 12c and 12d, each in the form of bars shaped and bent to produce the necessary turns, in a manner well known in the art, and located between sections of the primary 11 in order to produce high secondary currents. The primary 11 and secondaries 12a to 12d are mounted on a core 14 of laminated iron or, preferably within and around cross parts of such core.

The secondaries 12a to 12d are disposed in parallel planes and each has an extended leg portion, indicated in the drawings as 15a, 15b, 15c and 15d. Extending laterally from each leg portion is a foot formed of conductor material and separately identified in the drawings as 16a, 16b, 16c and 16d. Each foot provides an individual electric circuit means between one side of each secondary and a working supporting bus 17 mounted on the machine.

Extending from the other side of each secondary is an individual conductor lead, each of which is marked 20a, 20b, 20c and 20d in the drawing, connected to a terminal block, each of which is indicated 21a, 21b, 21c and 21d in the drawing. A flexible laminated conductor strip connects each terminal block with an electrode terminal block on which an electrode is mounted. The laminated strips are marked 22a, 22b, 22c and 22d; the electrode terminal blocks 23a, 23b, 23c and 23d and the electrodes 24a, 24b, 24c and 24d in the drawings.

The electrode terminal blocks are operated by suitable fluid operated cylinders and pistons 25a, 25b, 25c and 25d, which are supported on suitable brackets 26 secured to a part 27 of the machine frame.

The welder cylinders and pistons 25 are connected to a booster 30 by a manifold 31 and its connected conduits. When the booster 30 is operated, fluid pressure is transmitted through the manifold to the cylinders to produce simultaneous operation and movement of the electrodes 24a to 24d toward and to engagement of the bus 17 and the work located in a position between the electrodes and bus. The booster 30 may be connected to a source of air pressure through a control valve 32 and pipe 33. The valve 32 may be electrically operated by means of a solenoid 34, the coil of which is in circuit with a manually operated switch 35 and a source of electric current, the main lines 36 and 37.

The primary 11 of the transformer 10 is connected by lines 40 and 41 to opposite sides of a secondary 42 of a variable transformer 43 to produce, by adjustment of its parts, a required potential at the electrodes and bus. The individual nature of the circuit of each electrode when brought in contact with the bus greatly reduces the requisite potential and thus produces the same potential difference at the electrodes and bus by the same potential of the secondary 42. The total potential loss is greatly reduced in the provision of the individual circuit arrangement of each of the multiple of electrodes by reason of the reduction in the inductive reactance. Also, the same flow of current occurs through each electrode without regard to its respective position relative to other of the electrodes or their polarity or without need for special compensating transformers.

The current flow through the primary 45 of the variable transformer 43 is controlled by movement of the movable contactor 46, relative to the coils of the auto-transformer 47. The auto-transformer 47 is connected in circuit with main line 36 and with main line 37 through welder switch 48. Welder switch 48 is operated by solenoid 49 connected in circuit with timer relay 50 which controls the flow of current to the solenoid 49. The timer relay 50 is controlled by a pressure switch 55 operated by the pressure of the liquid transmitted by the booster to the welder operating cylinders 25. Preferably, the pressure switch 55 is set to complete the timer relay circuit, when the fluid pressure reaches a desired welding pressure. Current for the timer relay 50 and the solenoid 49 is received from main lines 36 and 37 through the medium of a transformer 56 having a primary 57 connected to main lines 36 and 37 and a secondary 58 connected to the timer relay 50.

In the arrangement shown in Fig. 3, substantially the same electrical elements are utilized, excepting that the bus 17 is not in circuit in the sense that it is connected to the secondaries of the multiple secondary transformer 10. In lieu thereof, the alternating electrodes 24a and 24c and electrodes 24b and 24d are connected each to opposite sides of the secondaries. This arrangement disposes of the need for two of the secondaries utilized in the preferred form and results in greater space saving with resultant allowance for locating the electrodes in closer proximity to the secondaries and shorter lead straps.

Thus, referring to Fig. 3, it will be seen that electrode 24a through its associated electrode terminal block 23a, laminated strip conductor 22a, secondary terminal block 21a and lead 62a is connected to one side of the secondary 60 and electrode 24c is connected to the other side by 62c and its corresponding circuit parts. Electrodes 24b and 24d, likewise are connected by leads 62b and 62d to opposite sides of the secondary 61.

When the electrodes simultaneously engage the work on the bus 17 current will flow from electrode 24a through the bus 17 to electrode 24c in completion of the individual circuit of the secondary 60 and from electrode 24b through the bus to electrode 24d in completion of the individual circuit of the secondary 61.

Thus, the desired uniform flow of current to produce a desired potential, simultaneously, at all work contacting points of the multiple electrodes and bus may be obtained by adjustment of the variable transformer 43 to meet the variable conditions or characteristics of the work engaged between the electrodes and bus. The current losses from secondary to electrodes are materially reduced by reason of the greatly lessened distances between the electrode and secondary and the need for using only considerably shortened leads.

The number of secondaries in the multiple secondary transformer 10 bears a direct and even ratio to the number of electrodes mounted on the machine. This ratio is 1 to 1 or 1 to 2 as distinct from the prior art arrangements of 1 to 3 or 2 to 3 and the like. The relation of 1 to 1 and 1 to 2 existing between the number of secondaries and electrodes is referred to in the claims as an "even ratio."

While I have illustrated and described the best form of my invention now known to me, as required by the statutes, those skilled in the art will readily understand that changes may be made in the disclosed construction without departing from the spirit of my invention as set forth in the appended claims.

I claim:

1. In a welding machine having the combination of a plurality of tipped electrodes, a multiple secondary transformer having a single primary and a plurality of secondaries, the number of secondaries being equal to the number of electrodes and paired therewith, each secondary being capable, upon a flow of current through the primary, of producing the same potential, a work supporting bus formed of conductive material mounted on the machine, the electrodes supported on the machine in adjacent relation to each other along a line extending substantially parallel to the bus and spaced from the bus to receive work between the electrodes and the bus, a source of current, means for operating the electrodes to cause the electrodes to simultaneously engage the work between the electrodes and the bus, means for causing a flow of current from said source of current to the transformer primary, when the electrodes engage the work with a predetermined pressure, to simultaneously produce current flow through all secondaries at a uniform potential, and a means individual to each paired electrode and secondary electrically connecting the electrode of said pair to one side of the secondary of said pair; the provision of a plurality of conductor elements, the number of said conductor elements being equal to the number of said secondaries, said conductors connected to the bus at a plurality of points spaced along the bus and to the sides of secondaries opposite that to which the electrodes are connected, each conductor being individual to one of said points and the secondary of one of said pairs.

2. In a welding machine as claimed in claim 1 further characterized by the fact that said point of connection of each conductor element is spaced a distance along the bus from the connection of another of said conductor elements a distance equal to the distance between adjacent electrodes.

3. In a welding machine as claimed in claim 1 further characterized by the fact that said point of connection of each conductor element with the bus is in substantial axial alignment with the tip of the particular electrode paired with and connected to the secondary to which said conductor element is connected.

4. In a welding machine having the combination of a plurality of tipped electrodes, a multiple secondary transformer having a single primary and a plurality of secondaries, the number of secondaries being equal to the number of electrodes and paired therewith, each secondary being capable, upon a flow of current through the primary, of producing the same potential, a work supporting bus formed of conductive material mounted on the machine, the electrodes supported on the machine in adjacent relation to each other along a line extending substantially parallel to the bus and spaced from the bus to receive work between the electrodes and the bus, a source of current, means for operating the electrodes to cause the electrodes to simultaneously engage the work between the electrodes and the bus, means for causing a flow of current from said source of current to the transformer primary, when the electrodes engage the work with a predetermined pressure, to simultaneously produce current flow through all secondaries at a uniform potential, and a means individual to each paired electrode and secondary electrically connecting the electrode of said pair to one side of a secondary of said pair; the provision of conductor means including a plurality of conductor elements, the number of conductor elements being of a magnitude in even ratio to the number of secondaries, the bus having a plurality of points, spaced along the bus at distances from each other substantially equal to the distances between adjacent electrodes and substantially in axial alignment with the electrode tips, the conductor elements connecting each of said points to the other side of the secondary connected to the electrode whose tip is in said axial alignment with the said point.

WILLIAM H. MARTIN.

REFERENCES CITED

The following references are of record in the file of this patent:

UNITED STATES PATENTS

| Number | Name | Date |
|---|---|---|
| 1,247,741 | Taylor | Nov. 27, 1917 |
| 2,238,419 | Hass | Apr. 15, 1941 |
| 2,295,925 | Biederman | Sept. 15, 1942 |
| 2,300,656 | Dall | Nov. 3, 1942 |